UNITED STATES PATENT OFFICE 2,307,679

CYANOMETHYL CHLOROFORMATE AND METHOD OF PREPARING THE SAME

Ingenuin Hechenbleikner, Stamford, Conn., assignor to American Cyanamid Company, New York, N. Y., a corporation of Maine No Drawing. Application February 24, 1941,
Serial No. 380,377

3 Claims. (Cl. 260—464)

The present invention relates to cyanomethyl chloroformate of the following formula:

$$N\equiv C-CH_2-O\underset{\underset{O}{\|}}{C}-Cl$$

and to a method of preparing the same.

The principal object of the invention is to devise a simple method for the preparation of this new substance which is valuable as an intermediate in general organic synthesis. It is particularly useful for the preparation of compounds of the type—

$$CN-CH_2-O\underset{\underset{O}{\|}}{C}-OR$$

or $$CN-CH_2-O\underset{\underset{O}{\|}}{C}-\underset{\underset{R^2}{|}}{N}-R^1$$

where $R^1$ and $R^2$ can be H or aryl or alkyl $$CN-CH_2-O\underset{\underset{O}{\|}}{C}-S-R$$

or the like. This conversion is comparatively simple inasmuch as the chlorine of the present compound is readily replaceable.

57 grams (1 mol) of glycolonitrile was added slowly to a mixture of 148 grams of phosgene (1.5 mols) and 121 grams of dimethyl aniline (1 mol) in 100 cc. of ether, while the reactants were maintained at from 5 to 10° C. The contents of the reaction vessel were stirred during the nitrile addition. When all of the glycolonitrile had been added, the mixture was permitted to warm to room temperature. The reaction mixture was then poured upon 300 grams of crushed ice whereupon a colorless liquid separated at the bottom of the flask. After separation, this liquid was washed with ice water, dissolved in ether, dried and distilled at 1 mm. 95 grams of a product distilled at 45° C., which was identified by analysis as cyanomethyl chloroformate of the following formula:

$$N\equiv C-CH_2-O\underset{\underset{O}{\|}}{C}-Cl$$

This represents a yield of 80% based upon the glycolonitrile used. It has been noted that the compound decomposes upon standing at 25° C. for twelve hours to a brown resinous material.

While the invention has been described with particular reference to specific embodiments, it is to be understood that it is not to be limited thereto but is to be construed broadly and restricted solely by the scope of the appended claims.

I claim:

1. Cyanomethyl chloroformate having the following formula:

$$N\equiv C-CH_2-O\underset{\underset{O}{\|}}{C}-Cl$$

2. A method of preparing cyanomethyl chloroformate which includes the steps of reacting glycolonitrile, phosgene and dimethyl aniline in a mixture of ether, pouring the reaction medium onto crushed ice and recovering the cyanomethyl chloroformate therefrom.

3. A method of preparing cyanomethyl chloroformate which includes the steps of reacting glycolonitrile, phosgene, and dimethyl aniline in the presence of ether at temperatures no higher than 25° C., pouring the reaction mixture onto ice and recovering the separated cyanomethyl chloroformate by distillation at reduced pressure.

INGENUIN HECHENBLEIKNER.

CERTIFICATE OF CORRECTION.

Patent No. 2,307,679.                              January 5, 1943.

INGENUIN HECHENBLEIKNER.

It is hereby certified that error appears in the printed specification of the above numbered patent requiring correction as follows: Second column, line 27, claim 2, for "mixture of ether, pouring the reaction medium" read --medium of ether, pouring the reaction mixture--; and that the said Letters Patent should be read with this correction therein that the same may conform to the record of the case in the Patent Office.

Signed and sealed this 8th day of June, A. D. 1943.

(Seal)

Henry Van Arsdale,
Acting Commissioner of Patents.